United States Patent [19]

Schuurman

[11] 4,421,087
[45] Dec. 20, 1983

[54] ALTERNATIVE LIQUID FUEL INJECTION SYSTEM AND METHOD

[76] Inventor: Eiko A. Schuurman, 70 Rechthuisdrift, Nieuwegein, Netherlands

[21] Appl. No.: 346,251

[22] Filed: Feb. 5, 1982

[51] Int. Cl.³ .............................................. F02M 7/00
[52] U.S. Cl. .................................... 123/445; 123/478; 123/525; 123/1 A; 123/462; 123/458; 123/576; 123/577
[58] Field of Search ................... 123/525, 527, 276 E, 123/1 A, 445, 446, 458, 462, 478–494, 575–578

[56] References Cited

U.S. PATENT DOCUMENTS

| | | | |
|---|---|---|---|
| 2,376,479 | 5/1945 | Fehling | 123/68 |
| 2,767,691 | 10/1956 | Mengelkamp et al. | 123/1 A |
| 3,565,201 | 2/1971 | Petsinger | 123/527 |
| 3,978,823 | 9/1976 | Simon | 123/1 A |
| 4,015,569 | 4/1977 | Leshner et al. | 123/431 |
| 4,296,722 | 10/1981 | Furuhashi et al. | 123/478 |

OTHER PUBLICATIONS

WO8200492 PCT Pefley et al.

*Primary Examiner*—Charles J. Myhre
*Assistant Examiner*—E. Rollins Cross
*Attorney, Agent, or Firm*—Leonard Belkin

[57] ABSTRACT

A liquid fuel injection system for an internal combustion engine in which the fuel, gaseous under ambient conditions, is injected in liquid form under compression into the intake manifold of the engine. Fuel is controlled largely by intake manifold pressure together with the RPM of the engine. Some fuel bypasses the injector, is vaporized and fed into the intake manifold through a sleeve in sufficient amounts to maintain the engine at idle and low load conditions and prevent the injector from freezing.

20 Claims, 4 Drawing Figures

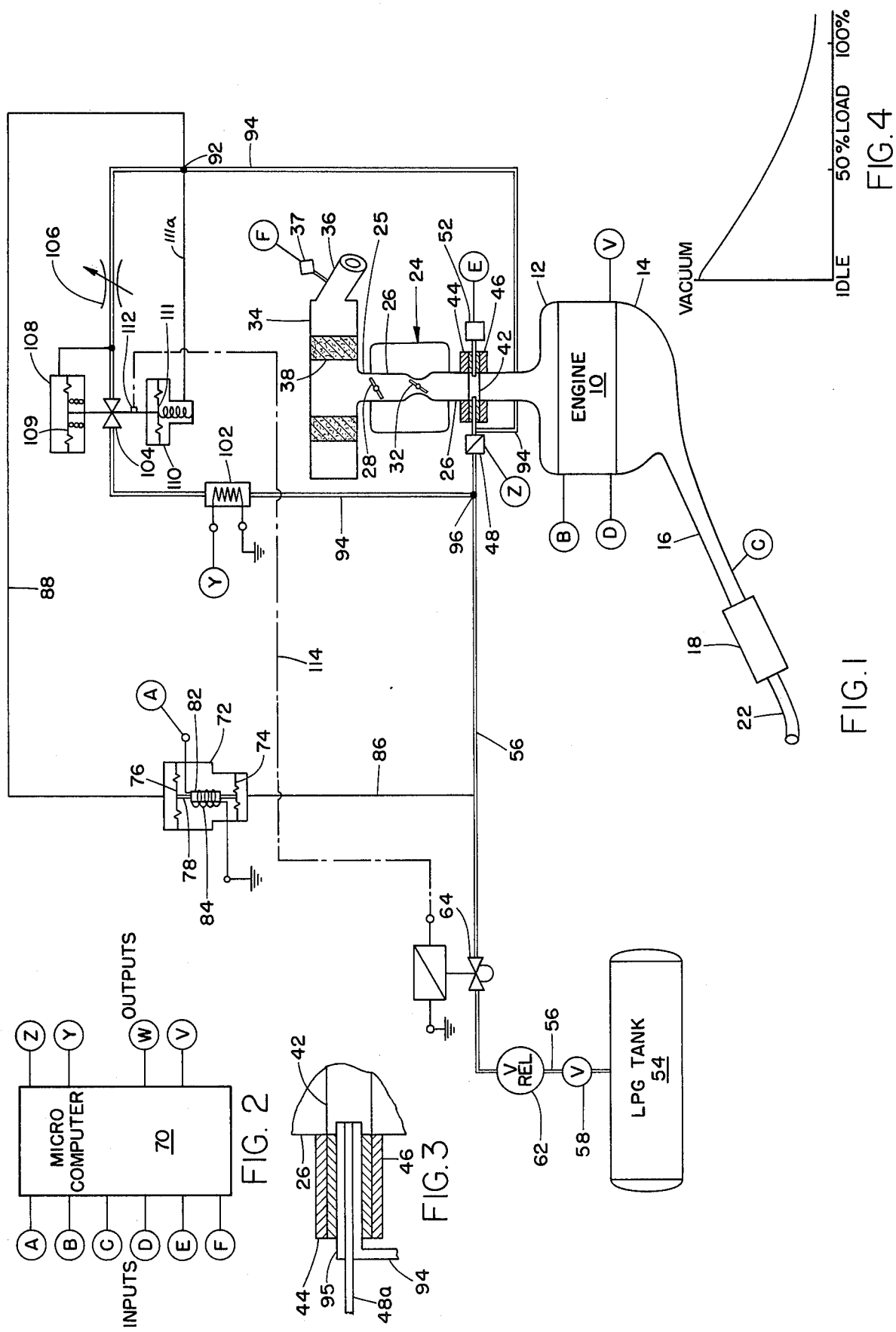

ALTERNATIVE LIQUID FUEL INJECTION SYSTEM AND METHOD

BACKGROUND OF THE INVENTION

This invention relates to a liquid fuel injection system and method for use in an internal combustion engine and is especially useful when an alternative fuel such as a gaseous fuel is to be employed in the place of gasoline.

The rapidly rising cost of gasoline during the last few years has encouraged interest in the use of alternative fuels in such engines instead of gasoline and one of the alternatives is a class of fuels referred to as gaseous fuels. By gaseous fuels herein is meant hydrocarbon fuels which are gaseous under ambient conditions or light hydrocarbon liquids which become gaseous by preheating. Examples of these fuels are liquefield petroleum gases (LPG) containing propane or butane or mixtures of both, liquefield natural gas (LNG) containing predominantly methane with some ethane but no more than trace quantities of other materials, and natural gas liquids (NGL) which are separated as liquids during the production of natural gas and contain, besides butane and propane, some ethane, pentane and heavier fractions. It is understood that reference herein to propane or LPG is meant to include any or all of the aforementioned gaseous fuels.

Recent discoveries of new sources of such fuels provide the prospect that gaseous fuels are likely to be in adequate supply over the next 10-20 years at prices which could be significantly below that of gasoline.

While gaseous fuels, LPG in particular, have been used with internal combustion engines for a long time, such use has not been on a large scale, largely due to the convenience and readily accessibility of gasoline, as well as the fact that until recently there was no significant price advantage of the gaseous fuel over the liquid fuel.

Due to recent international crises which produced periods of scarcity of gasoline as well as very substantial price increases in the latter fuel, there has developed renewed interest in using gaseous fuels in internal combustion engines, especially in vehicles such as cars, taxicabs and trucks.

All of these events were occurring at the same time that government imposed regulations with respect to mileage and emissions were being issued. Engines were and are becoming more sophisticated in design to meet these requirements including the application of electronic ignition systems and microprocessor control over engine performance.

These developments have made it more difficult to switch from gasoline to gaseous fuels in such vehicles because operating parameters were being altered so that the engineering which went into producing the desired mileage and emission goals could be negated when a new fuel is substituted for gasoline.

Attempts have been made to develop systems which could use gaseous and other alternative fuels in internal combustion engines. Some attempts involve the use of the alternative fuel as a supplement to gasoline under certain operating conditions, and such arrangements are shown in U.S. Pat. Nos. 2,525,576, 2,129,930, 2,657,913, 3,618,579, and 4,181,100.

One of the problems associated with the use of gaseous fuels in internal combustion engines is the tendency for vapor lock to develop if an attempt is made to restart an engine while it is still hot.

SUMMARY OF THE INVENTION

The present invention overcomes or minimizes many of the problems mentioned above and makes it possible to use gaseous fuels effectively, economically, and efficiently in internal combustion engines designed for gasoline use.

In accordance with the principles of this invention there is provided a system and method in which a gaseous fuel in its liquid state is injected directly into the intake manifold of an internal combustion engine in amounts controllable by load and other factors while some of the fuel is vaporized in order to maintain proper engine operation during idling and low speed conditions, and provision is made to avoid vapor lock during warm engine restarting.

In a preferred embodiment of this invention, a source of gaseous fuel in liquid state is provided, an injector inserts the liquid fuel directly into the intake manifold of the engine whenever the engine is operating above an idle or low speed condition, and a control system adjusts the injection to supply the correct amount of fuel as determined by various engine parameters. Some of the fuel is made to bypass the injector and be vaporized, and the resulting vaporized fuel is fed directly into the intake manifold at the same time preventing the injector from freezing. The amount of fuel so bypassed and vaporized is sufficient to maintain the engine in an idle condition or some preselected low load condition. A microprocessor is employed to control the fuel injection and a variety of engine conditions may be continuously monitored to obtain the desired efficiency and meet the emission standards for the particular engine.

Another embodiment of this invention involves the method of operating an internal combustion with the injection of a gaseous fuel in its liquid state.

It is therefore a principal object of this invention to provide an improved fuel feed and control system for an internal combustion engine in which a gaseous fuel is used effectively and efficiently.

Other objects and advantages of this invention will hereinafter become obvious from the following description of preferred embodiments of this invention.

BRIEF DESCRIPTION OF THE DRAWINGS

FIG. 1 is a schematic illustration of a preferred embodiment of this invention.

FIG. 2 shows schematically a microprocessor being used with the preferred embodiment.

FIG. 3 shows details of the injector nozzle.

FIG. 4 illustrates graphically the relationship of intake manifold pressure with load for which the microprocessor can be programmed.

DESCRIPTION OF THE PREFERRED EMBODIMENTS

Referring to FIG. 1, there is shown an internal combustion engine 10 having an intake manifold 12 and an exhaust manifold 14.

Exhaust gases leave manifold 14 by way of exhaust pipe 16, catalytic converter/muffler 18, and tail pipe 22.

Connected to intake manifold 12 is a carburetor 24 with an intake pipe 25 having a throat 26 containing a choke valve 28 and a throttle valve 32. To intake pipe 25 is connected an air filter housing 34 with a snorkel 36 for incoming air and containing air filter 38.

Carburetor 24 is shown only schematically and it is understood that there is provided, although not shown, a source of gasoline fuel for carburetor 24. When the embodiment of this invention about to be described is employed, it is not necessary to remove or tamper with the existing carburetor or fuel supply other than turn off the source of the gasoline, such as by disabling the fuel pump or employing a shut off valve. However, choke 28 and throttle 32 are left unaltered and function in their usual way, as will be seen from below.

Returning to FIG. 1, it will be seen that where inlet pipe 25 is attached to intake manifold 12 there is inserted an adapter 42 held by flanges 44 and 46. Adapter 42 accomodates a fuel injector 48 with a nozzle 48a and a temperature sensor 52, to be later described.

Fuel for engine 10 is supplied from an LPG tank 54 and is carried to engine 10 by way of a fuel line 56 to injector 48. In line 56 there is provided a shut-off valve 58, a pressure relief valve 62, and a combined fuel filter/lock off valve 64. In normal operation of this fuel system just described the fuel in tank 54, gaseous under ambient conditions, is compressed to liquefaction and is supplied under pressure to injector 48 in its liquid state. If the fuel being supplied were in its gaseous state, then a compressor or other means would be provided to transform the gas into its liquid state for use in this system.

Injector 48 is of the pulsation type in which the liquid fuel is injected in a series of pulses. Control over the rate of fuel being injected is exercised by adjusting the length of each pulse of fuel, that is, fuel injection pulse width. Such injectors are well known in the art and are commercially available as indicated in U.S. Pat. No. 4,261,314.

Control over fuel delivered by injector 48 as well as other components of the system to be described below is exercised by microcomputer 70, shown schematically in FIG. 2.

Returning to FIG. 1, a fuel control regulator 72 is provided which contains a pair of diaphragms 74 and 76 connected by a rod 78 on which is mounted an iron core 82 within a coil 84. As is understood in the art, movement of core 82 along the axis of coil 84 will alter the inductance of the latter, and if an alternating voltage or current is applied across to coil 84 in a closed circuit than current flow or voltage will vary in accordance with the changes in inductance and hence the position of core 82. Such changes are transmitted as input A to microcomputer 70.

To effect the movement of core 82, lower diaphragm 74 is exposed on one side through a line 86 to fuel pressure within line 56 just in front of injector 48 and upper diaphragm 76 is exposed at its upper side through a line 88 to a juncture 92 in a bypass pipe 94. The chamber between diaphragms 74 and 76 is open to the atmosphere.

Bypass pipe 94 bleeds a small amount (up to 10% by volume) of fuel from main fuel line 56 at a juncture 96 and feeds this bypassed fuel through a heater 102 into intake manifold 12 by a sleeve 95 surrounding the nozzle 48a of injector 48, as shown in FIG. 3, preventing any freeze up at the tip of nozzle 48a within throat 26. In pipe 94 is provided in addition to heater 102 to vaporize the fuel flowing in this line, a control or pressure reduction valve 104, and a manually adjustable valve 106 to permit idle speed of engine 10 to be adjusted. The pressure of the gaseous fuel in line 94 downstream of control valve 104 at juncture 92, is close to and fluctuates with pressure within intake manifold 12 so that line 88 extending from juncture 92 to regulator 72 transmits this pressure and its fluctuation with load.

Control valve 104 is subject to control by an idle pressure regulator 108 and a vacuum and deceleration lockoff regulator 110.

Pressure regulator 108 contains a spring biased diaphragm 109 which mechanically adjusts the opening in valve 104 in response to fuel pressure just upstream of idle adjustment valve 106. The purpose of this arrangement is to stabilize the pressure of the gaseous fuel being delivered to inlet pipe 26.

Vacuum and deceleration lockoff regulator 110 contains a spring biased diaphragm 111 which tends to alter the opening in valve 104 in accordance with changes in vacuum as measured at juncture 92 through a line 111a causing the opening in valve 104 to become more restricted with decreasing manifold vacuum and vice versa. When there is no vacuum, i.e. engine not running, diaphragm 111 will cause complete closure of valve 104, thereby blocking flow of fuel in line 94, and under this condition a switch 112 connected to valve 104 will shut down lockoff valve 64, blocking flow of liquid fuel in line 56, as illustrated in schematic connection 114. This is an override arrangement designed to prevent the flow of fuel when engine 10 is not running.

It should be noted that juncture 92 being located at some intermediate point on line 94 between juncture 96 and inlet pipe 26 there is as a result of the pressure drop a higher pressure at 94 than in the manifold of engine 10. This has the effect of producing a more fuel enriched mixture at full load which is desired.

Mirocomputer 70, shown in FIG. 2, may be employed not only to control fuel delivery through its output Z to fuel injector 48 in accordance with input A from regulator 72 but also to respond to a variety of engine conditions and through a previously prepared program affect other conditions of operation. For example, inputs to microcomputer 70 can include in addition to differential fuel/intake manifold pressure at A, RPM pickup at B, exhaust emissions analysis at C, engine coolant or oil temperature at D, fuel air mixture temperature at E from sensor 52, and air inflow temperature at F from sensor 37. It should be noted that the combination of intake manifold pressure as indicated at A and RPM pickup at B, together reflect the load on engine 10.

Outputs from microcomputer 70 could include in addition to Z for the control of fuel injector 48, some or all of the following: Y for the control of heater 102 (when computer control is not utilized, heater 102 may be provided with a thermostat to insure there is always enough heat to vaporize the fuel in bypass line 94), W to shut off the gasoline fuel supply to carburetor 24 (not illustrated) when this system is not in use, and V to adjust the spark advance of engine 10.

It is understood that microcomputer 70 would include a microprocessor and other features as would be required to carry out the functions described above, all of which are now well known in the art, as indicated in U.S. Pat. Nos. 4,188,922, 4,155,332, 4,214,306, and 4,261,314. Companies now have available commercially a variety of microprocessors capable of carrying out any of the above functions, for example, the RCA CMOS chip CDP-1802 and fixed or programmable memories CDP-1823 and CPR 1833, respectively.

In the operation of the system just described, with engine 10 initially not running, main suppy valve 58 would ordinarily be left open and valves 64 and 104 would be closed. Turning on of the ignition and cranking of engine 10 would result in the opening of valves 64 and 104 and operation of heater 102 so that the liquid fuel would fill line 56 to injector 48 and fuel vapor will fill line 94 to injector sleeve 95 and intake manifold 12. Cranking of engine 10 produces a suction in manifold 12 drawing in fuel by way of sleeve 95 sufficient to maintain idling of engine 10. The operation of choke 28 which may be automatic or manual would serve to produce a rich mixture in engine 10 and thereby facilitate starting of the engine. Also, in case of a cold engine at starting, the microprocessor in microcomputer 70 may be programmed to effect liquid fuel injection for a predetermined period of time after the ignition is turned on to obtain the extra enrichment which may be required.

When the accelerator (not shown) is depressed to call for more fuel (opening throttle 32) to meet increasing load (ie, to accelerate the engine), intake manifold vacuum will decrease causing regulator 72 to call for delivery of additional fuel by injector 48 to meet the demand.

With microcomputer 70 programmed for the desired fuel delivery over the whole range of intake manifold pressure up to full load as shown graphically in FIG. 3, there will automatically be delivered the amount of fuel required for each condition to maintain the exact air-fuel ratio required, taking into account that fuel vapor in line 94 will continuously be delivered in relatively small amounts to intake manifold 12 by way of sleeve 95.

As sufficient fuel vapor is supplied to intake manifold 12 from sleeve 95 on injector nozzle 48a to maintain engine idling conditions, injector 48 will not ordinarily supply fuel at idle. As the load on engine 10 increases, at some particular low load condition, microcomputer 70 will initiate operation of fuel injector 48.

In regulator 72, it will be seen that diaphragm 74 is smaller than diaphragm 76 so that the effect of changes in intake manifold pressure is greater than the effect of changes in fuel pressure. Basically the control is over air fuel ratios in terms of volume and because the fuel is injected directly into manifold 12 in its liquid form, control by regulator 72 will largely be dictated by intake manifold pressure.

One of the problems inherent in the injection of a gaseous fuel in liquid form, or a fuel such as alcohol which vaporizes readily, is the tendency to develop vapor lock under certain conditions. For example, when engine 10 is turned off, the heat in the system will tend to vaporize fuel trapped in line 56. After the engine cools then the fuel becomes liquefied again due to the prevailing pressure. But if an attempt is made to restart engine 10 before liquefaction occurs, it can be readily seen that injector 48 would be ineffective to pump the vaporized fuel.

However, in the present arrangement, cranking of engine 10 under the conditions just described, will pull the vapor through line 94 and sleeve 95 into intake manifold 12 thereby drawing fresh, cooled fuel in liquid state from tank 54 into line 56, cooling the line down within just a few seconds and making it possible for injector 48 to become effective.

Valve 64 may be provided with a pressure relief for backflow in the event an excess of pressure develops in line 56 downstream of this valve.

This invention can also employ liquid fuels which are readily vaporizable, such as alcohol, as already noted.

The fuel would not be under the same pressure in line 56 as compressed, liquefied fuel would be, so a pressurized tank using nitrogen for example, or a fuel pump would be necessary, and heater 102 would provide sufficient energy to cause its vaporization.

It is thus seen that there has been provided an improved fuel supply and control system making it possible to utilize LPT and other gaseous fuels in an internal combustion engine. The use of a liquid fuel injector permits accurate and close control over fuel suppl thereby insuring that maximum economy can be attained while at the same time limiting exhaust emissions to acceptable levels. In addition, starting of the engine by this invention is made more reliable and trouble-free than has been heretofore been possible with the use of gaseous fuels.

While only preferred embodiments of this invention have been described it is understood that many variations thereof are possible without departing from the principles of this invention.

What is claimed is:

1. A fuel injection system for an internal combustion engine having an intake manifold comprising:
    (a) means for supplying a gaseous fuel in a liquid state;
    (b) means for receiving said fuel and injecting same in a liquid state directly into said intake manifold;
    (c) means responsive to predetermined engine conditions for controlling the rate at which fuel is supplied to said manifold by said injecting means; and
    (d) means for providing vaporized fuel for starting and idling conditions comprising bypass means for withdrawing up to 10% by volume of said fuel prior to injection, vaporizing the bypassed fuel and delivering same to said intake manifold, bypassing said injecting means.

2. The system of claim 1 in which the amount of fuel being bypassed is sufficient to maintain said engine at idle.

3. The system of claim 2 in which said injecting means is inoperative when said engine is idling.

4. The system of claim 3 in which said injecting means becomes operative at some predetermined engine load condition.

5. The system of claim 4 in which said controlling means includes regulator means responsive to changes in intake manifold and fuel pressures.

6. The system of claim 5 in which said controlling means also includes electrical computer means responsive to said regulator means for controlling the rate of fuel delivered by said injecting means.

7. The system of claim 6 in which said computer means is also responsive to the RPM of said engine and said computer means is programmed to supply fuel in predetermined amounts under any load condition.

8. The system of claim 7 in which said computer means is programmed to provide fuel injection during cold start conditions of said engine.

9. The system of claim 7 in which the load on said engine is determined by inlet manifold vacuum and the RPM of said engine.

10. The system of claim 9 in which said computer means is also responsive to other engine conditions including emissions and engine temperature, and also affects the control of ignition timing of said engine.

11. The system of claim 4 in which said injecting means is provided with sleeve means for feeding the bypassed, vaporized fuel into said intake manifold, the heat contained within the vaporized fuel simultaneously preventing freezing conditions in said injecting means.

12. The system of claim 5 in which said bypass means includes means for controlling the flow of vaporized fuel into said intake manifold.

13. The system of claim 12 in which said flow controlling means is responsive to changes in intake manifold pressure.

14. The system of claim 13 in which loss of vacuum in said intake manifold causes said flow controlling means to block all flow of vaporized fuel.

15. The system of claim 13 having means responsive to blockage of all flow by said flow controlling means to cause blockage of flow of liquid to said injecting means.

16. The method of controlling delivery of liquefied gaseous fuel to an internal combustion engine, said engine having an intake manifold and means for injecting said liquid fuel into said intake manifold, comprising the steps of:

(a) regulating flow of fuel in liquid form to said injecting means in accordance with inlet manifold and liquid fuel pressures;
(b) bypassing said injecting means with up to 10% by volume of said liquid fuel;
(c) vaporizing the bypassed fuel;
(d) delivering the vaporized bypassed fuel directly into said intake manifold, the amount of fuel bypassed and vaporized being used to start and maintain said engine at idle.

17. The method of claim 16 in which said injecting means is rendered inoperative during engine idle and rendered operative above some predetermined load condition of said engine.

18. The method of claim 17 in which the amount of vaporized fuel being fed into said intake manifold is adjusted in accordance with changes in intake manifold pressure.

19. The method of claim 18 in which the flow of vaporized fuel is blocked when no vacuum is present in said intake manifold.

20. The method of claim 19 in which liquid fuel flow is blocked when vaporized fuel flow is blocked.

* * * * *